Sept. 9, 1941.   S. L. WILLIS   2,255,237
APPARATUS FOR MAKING MULTICELLULAR GLASS
Original Filed Nov. 5, 1937   2 Sheets-Sheet 1
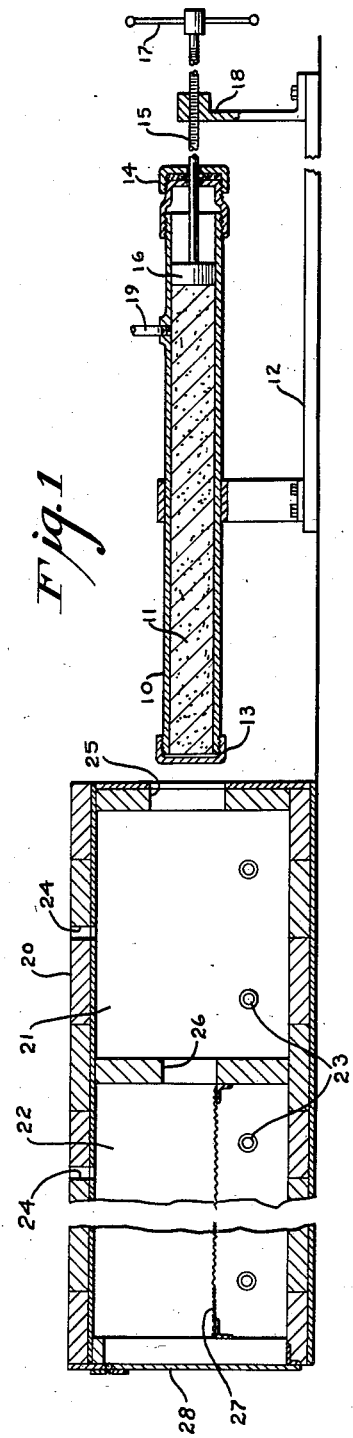
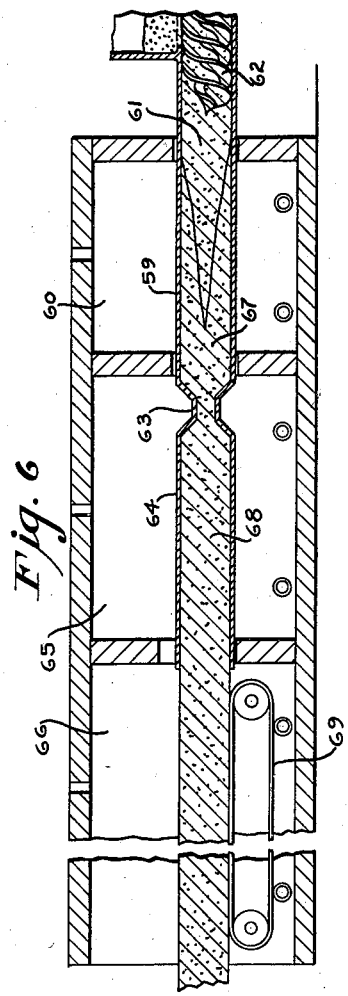
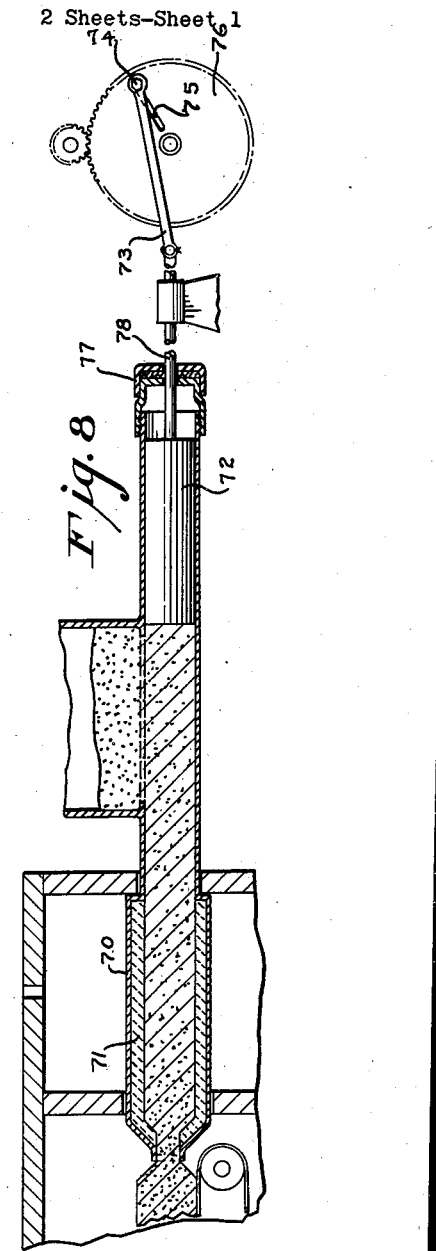
INVENTOR.
SANFORD L. WILLIS
BY Dorsey, Cole & Garner
ATTORNEYS.

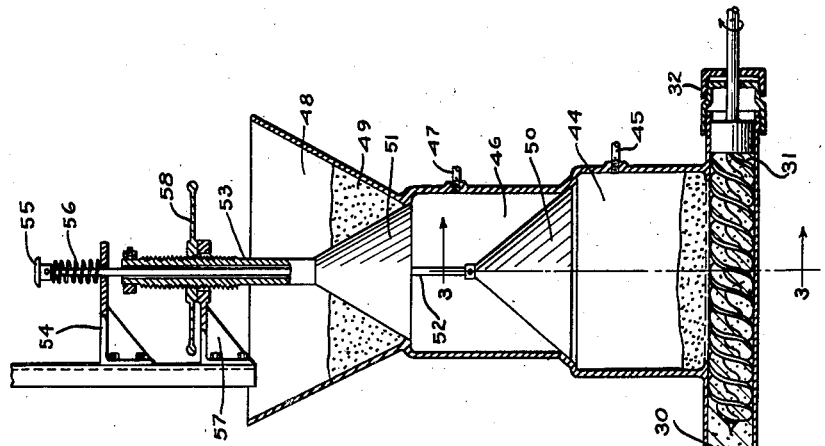
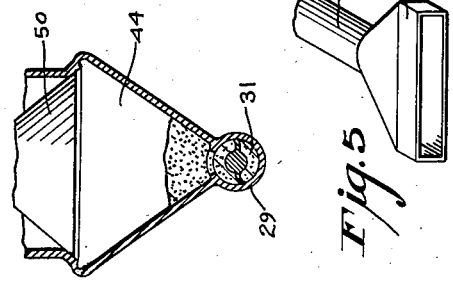
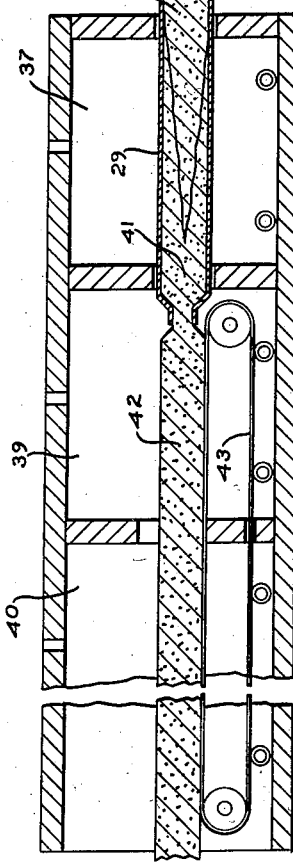
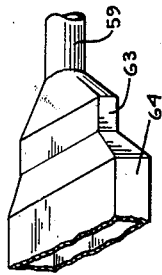
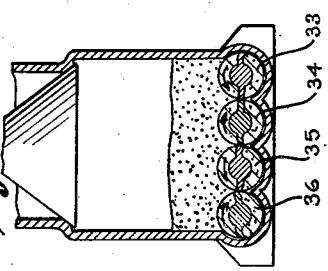

Patented Sept. 9, 1941

2,255,237

UNITED STATES PATENT OFFICE 2,255,237

APPARATUS FOR MAKING MULTI-CELLULAR GLASS

Sanford L. Willis, White Plains, N. Y., assignor to Corning Glass Works, Corning, N. Y., a corporation of New York Continuation of application Serial No. 173,018, filed November 5, 1937. This application filed June 7, 1938, Serial No. 212,330

7 Claims. (Cl. 49—1)

This invention relates to the production of glass foam or multicellular glass and to the fabrication therefrom of articles such as bricks, blocks, sheets and the like for building construction, insulation, etc.

Prior methods of making such articles are for the most part discontinuous or intermittent processes and there has been a notable lack of uniformity in the product in that the cells or voids vary considerably as to size and number with consequent variation in specific gravity and mechanical strength. Gasifying materials which are added to the glass are lost in varying degree during melting of the glass or fabrication of the article, depending upon the time and temperature of heating, with consequent variation in cell structure.

It is the object of this invention to produce multicellular glass articles of uniform cell structure.

The above and other objects may be accomplished by practicing my invention, which embodies among its features heating granular or pulverized glass under fluid pressure to sinter the glass particles and entrap compressed interstitial air or other gas, thereby producing a frit containing compressed gas bubbles, further heating the fritted mass to sufficiently soften the glass and reducing the fluid pressure to cause expansion of the bubbles. In certain instances the pulverized glass may be confined with or without additional mechanical pressure during the initial heating. Likewise finely divided material may be mixed with the pulverized glass which, on heating, will decompose or react to provide additional gas within the fritted mass to cause its expansion.

The invention of the present application resides in various novel features of the processes and apparatus described and claimed herein. The major portion of the apparatus used in practicing these processes and certain of the processes themselves are fully disclosed in my co-pending application Serial Number 173,018, filed November 5, 1937, of which this application is a continuation. The features of these processes will be more fully apparent when considered in conjunction with the operation of the apparatus illustrated in the accompanying drawings in which:

Fig. 1 is an elevation mostly in section of an apparatus for sintering granular or pulverized glass under pressure in accordance with my invention;

Fig. 2 is an elevation partly in section of an apparatus for continuously sintering granular or pulverized glass under pressure and thereafter expanding it in accordance with my invention;

Fig. 3 is a sectional view on the line 3—3 of Fig. 2 showing a feeding means;

Fig. 4 is a sectional view of a modification of the feeding means of Fig. 3 showing a multiple screw feed;

Fig. 5 is a detail perspective view of the orifice of the apparatus shown in Fig. 2;

Fig. 6 is a vertical sectional view of a modified portion of the apparatus shown in Fig. 2;

Fig. 7 is a detail perspective view of the orifice of the apparatus shown in Fig. 5; and Fig. 8 is a sectional view of a modified form of feeding mechanism and sintering tube.

In Fig. 1 a sintering tube 10, which in the present instance has a circular cross section but which may have any desired cross sectional form, contains granular or pulverized glass 11 to be fritted and is rigidly attached to a movable base 12. One end of the tube 10 is closed by a cap 13 while the opposite end is provided with a stuffing box 14 through which passes a rod 15. Within the tube 10 the inner end of the rod 15 is attached to a piston 16 and its outer end is provided with a hand wheel 17. The outer portion of the rod 15 is threaded and passes through a feed block 18 which is also attached to the base 12. Rotation of the hand wheel 17 will thus advance the piston 16 within the tube 10. An inlet 19 is provided for admission of compressed air or other suitable gas.

Positioned in front of the tube 10 is a sintering furnace 20 which is divided into two chambers 21 and 22 and is provided with burners 23 and vents 24 for the escape of combustion products. The chamber 21 is provided with a side port 25 for insertion of the tube 10 while chamber 22 is provided with a port 26 for entrance of the extruded frit, a shelf 27 to receive the frit and a door 28 to permit its removal from the kiln.

In Fig. 2 a sintering tube 29 containing granular or pulverized glass 30 is provided with a feed screw 31 the shaft of which passes through a stuffing box 32 and is driven by a motor and reduction gears (not shown). Alternatively a plurality of feed screws 33, 34, 35, and 36 may be employed, as shown in Fig. 4 in which the screws 33 and 35 are threaded in one sense, for example, left handed, and the screws 34 and 36 are threaded in the opposite sense. The right and left handed screws are rotated in alternate directions. Obviously a piston may be employed in lieu of the feed screws of Figs. 3 and 4 as shown in Fig. 8 in which event the piston may possess any desired cross sectional shape to conform with the general cross sectional shape of the sintering tube, that is, circular or rectangular. The tube 29 extends into and through a sintering furnace 37 and its end is drawn down and spread to form a rectangular orifice 38 as shown in Fig. 5, the cross sectional area of which is substantially equal to that of the sintering tube 29, but may be less as will appear. Adjoining the sintering furnace and communicating therewith is a kiln 39 which forms the hot end of an annealing lehr 40. A fritted mass of glass 41 within the tube 29 extends through and from the orifice 38 into the kiln 39 and expands to form a cellular frit 42 which is received on a conveyor 43 moving through the kiln 39 and the lehr 40.

The glass may be fed to the sintering tube in any suitable or desired manner. For the purpose of illustration an arrangement for introducing separate charges intermittently will be described. On top of the tube 29 and communicating therewith, as shown in Figs. 2 and 3, is a vertical hopper comprising a lower chamber 44 which is provided with a compressed air or gas inlet 45, a middle chamber or air lock 46 which is also provided with a compressed air or gas inlet 47 and an upper chamber 48 which is open at its top for receiving a supply of granular or pulverized glass 49. A cone 50 separates the chamber 44 from the air lock chamber 46 and another cone 51 separates the air lock 46 from the upper chamber 48. A shaft 52 which is attached to the cone 50 and is adapted to raise and lower it, passes upwardly through a hollow shaft 53 which is attached to the cone 51 for the purpose of raising and lowering the cone 51. At its upper end the shaft 52 passes through a support 54 and is provided with a pressure actuated handle 55 which operates against a spring 56. The upper end of the shaft 53, which is spirally threaded, passes through a support 57 and is provided with a hand wheel 58 which is interiorly threaded to coincide with the threaded shaft 53, and which is adapted on being revolved to raise and lower the shaft.

In Fig. 6 a sintering tube 59 extending through a sintering furnace 60 is supplied with pulverized glass 61 by means of a screw feed 62 and compressed air in the manner shown and described above for Fig. 2. The tube 59 is provided with an orifice 63 and an intercommunicating expansion chamber 64, connected therewith as shown in detail in Fig. 7. The expansion chamber 64 extends through a kiln 65 which forms the hot end of a lehr 66. A fritted mass of glass 67 extends through the orifice 63 and is expanded to form a cellular frit 68 which fills the expansion chamber 64 and upon emerging therefrom is received upon a conveyor 69.

In Fig. 8 is shown a modification of the sintering apparatus of Fig. 2. In this structure the sintering tube 70 is provided with a refractory lining 71 to protect the tube itself from the abrasive and corrosive action of the melted frit. This refractory may be of any well known high melting point non-metallic material provided it can be made with a sufficiently smooth surface so as to permit movement of the charge under the pressure of the feeding mechanism. If such materials, as the electrocast refractories or the burned clay products result in too great adhesion with the charge, a graphite lining may be used which is not wet by glass. In this same modification a piston 72 is substituted for the feeding screws of the other modifications and is given a reciprocating movement by means of a connecting rod 73 operatively attached to crank pin 74 adjustably mounted in a radial slot 75 in the rotatable drive plate 76. A stuffing box 77 prevents loss of fluid pressure around the piston rod 78. The piston 72 may be operated with a short stroke and corresponding higher frequency. In view of the effects of the fluid pressure in feeding the material the arrangement may be such that the discharge of glass will be substantially continuous. Alternatively, the stroke of the piston may be long and less frequent and it may be operated to discharge successive unit masses, each of which is cut off as it is extruded. In the latter case the piston is particularly effective to confine the granular glass while it is being heated, applying more or less mechanical pressure as is desired. The piston head may be chilled to prevent sticking of the glass, or sticking may be sufficiently prevented by forming the operative face of graphite.

In practicing my invention a quantity of granular or pulverized glass 11 is introduced into the tube 10 which is closed with the cap 13, the piston 16 is advanced by turning the hand wheel 17 so as to bring the powdered glass under a slight mechanical pressure and compressed air is admitted thru the inlet 19 to maintain a pressure of about fifty to one hundred pounds per square inch within the tube and thruout the mass of pulverized glass. The piston 16, being not entirely air-tight, will not interfere with the passage of air to the forward part of the tube. The assembly on its base 12 is then advanced until the tube 10 is inserted within the chamber 21 of the furnace 20 and the temperature of the tube is maintained at the sintering point of the pulverized glass until the latter has sintered sufficiently to seal the end of the tube 10. The tube is then withdrawn from the furnace and the cap 13 is removed after which the tube is reinserted so that its end registers with the port 26 of the chamber 22. The piston 16 is then advanced at a rate sufficient together with the air pressure in the tube to extrude the sintered mass from the forward end of the tube 10 but not too fast to prevent complete sintering of the granular or powdered glass as it passes through the heated portion of the tube. The air pressure is maintained during the entire operation and as a result a viscous sintered mass of glass containing countless cells or bubbles of compressed air will be extruded from the end of the tube 10 and will be deposited upon the shelf 27 in the chamber 22. The temperature of the chamber 22 is maintained somewhat higher than that of the chamber 21 to further reduce the viscosity of the glass and cause air entrapped therein to expand and increase the size of the cells contained in the finished product. The expanded cellular frit is subsequently removed from the chamber 22 and may be annealed in the usual manner.

It will be apparent that the temperature at which the chambers 21 and 22 are to be maintained will depend upon the softening point of the glass employed and hence upon its composition. Practically any glass composition can be employed in my process, but it is preferable to use a glass having a relatively low softening point and a moderate temperature-viscosity range. In most instances it will be found desirable to employ temperatures of about 1100° F. in chamber 21 for sintering and from 1500° F. to 1800° F. in chamber 22 for expanding the frit, but with any particular glass the most suitable temperatures are readily determined by trial.

The modified form of apparatus which is illustrated in Fig. 2 is adapted for continuous production and may be employed either for making bricks, blocks and the like, or for the production of sheets and other large articles of multicellular glass. In this case the pulverized glass 30 is fed continuously into and through the extrusion or sintering tube 29 by means of the feed screw 31 and compressed air. A supply of pulverized glass is maintained in the chamber 44 and compressed air, admitted at the inlet 45, permeates and fills the interstices between the glass particles in the tube 29. For the purpose of replenishing the supply of pulverized glass in the chamber 44, the fresh quantity 49 is introduced into the air lock chamber 46 by lowering the cone 51 after which the cone is returned to its seat to seal the chamber 46 against the outside air. Compressed air is then admitted to the chamber 46 thru the inlet 47, preferably at a pressure slightly in excess of that maintained in the chamber 44 and the cone 50 is then lowered by operation of the handle 55. This permits the charge of pulverized glass to enter the chamber 44 without loss of the air pressure therein. After the pulverized glass has been discharged from the chamber 46, the cone 50 is returned to its seat and the chamber 46 is sealed from the chamber 44. Before a fresh charge of pulverized glass is introduced into the chamber 46 from the chamber 48, the air pressure in the chamber 46 preferably is released thru the inlet 47, thereby avoiding a blow-back when the cone 51 is again lowered.

As the pulverized glass 30 under the influence of the mechanical and fluid pressure is moved forward thru that portion of the extrusion tube 29 which is within the furnace 37, it is heated sufficiently to cause the glass particles to sinter and coalesce and entrap the air in the interstices thereof, thereby forming the viscous fritted mass 41 containing countless bubbles of compressed air. The frit 41 is forced continuously thru the orifice 38 into the kiln 39 and upon the conveyor 43. The temperature of the kiln 39, as pointed out above, is somewhat higher than the temperature of the sintering furnace 37 and under the influence of this increased temperature the viscosity of the frit 41 is reduced and the compressed air bubbles entrapped therein expand thereby forming the expanded frit 42 with a uniform cellular structure. The conveyor 43 continuously carries the expanded frit 42 into the annealing lehr 40 where it is slowly cooled in the usual manner after which it may be cut into blocks or sheets of convenient size by sawing or grinding or both.

The expansion of the fritted mass 41 by the method described above is unconfined and free to proceed to a maximum. It may be desirable to confine the mass during expansion or limit the thickness of the expanded frit in order to obtain a uniformly thick product with vitreous surfaces. This can be done by passing the expanded frit 42 between rolls (not shown) while it is still soft enough to be shaped but is preferably accomplished by means of the modified apparatus shown in Fig. 6. The fritted mass 67 is formed and extruded from the orifice 63 in the manner described above for Fig. 2. However, instead of being permitted to expand freely as before, it passes thru the expansion chamber 64 which maintains it to the desired dimensions when it expands during its travel thru the kiln 65. Expansion may take place transversely of the extruded frit or it may be caused to occur longitudinally thereof by speeding up the rate of flow in the expansion chamber. In the latter event the expansion chamber may have substantially the same cross section as the orifice. Upon issuing from the expansion chamber into the lehr 66 and upon conveyor 69, the expanded frit 68 will have acquired the dimensions of the expansion chamber.

The sintering tube of the embodiment illustrated is shown as horizontal. Certain advantages are obtained if the tube is positioned vertically providing certain features of a column. The weight of the glass will then have an effect, positive or negative, on the resistance to extrusion modifying the degree of choke necessary. If in such column the mass is fed downward the weight of the superimposed unconsolidated material above the sintering zone may provide the desired mechanical pressure at the sintering zone.

Other advantages may be obtained by feeding the charge upward in the vertical column. The weight of the column of material above the sintering zone will not necessarily add to the mechanical pressure compacting the glass at the sintering zone. The arrangements may be such that the air pressure predominates almost exclusively as the feeding force to feed and extrude the molten glass while the mechanical pressure merely holds the glass particles in place with as little pressure as desired. For some products it may be desirable even to release the mechanical pressure to permit the formation of large voids or weakened portions in the ribbon of glass.

It is a feature of the process herein described that provision is made for causing substantially equal amounts of air or other gas to be entrapped within the different zones of the sintering mass. If a quantity of pulverized glass resting on an impervious, non-porous support is heated in a muffle while maintaining normal atmospheric pressure within the muffle, the mass will fuse on the surface and will be cemented to the support at the edge and, as the heat penetrates inward, the expanded air will migrate inward while the successive zones fuse entrapping a proportion of the air. However, the migration of the air will bring about a condition wherein at the center there is a very considerably greater amount of air in proportion to the ground glass. The result of this is that a blow hole forms toward the center and makes it impossible to obtain a uniform cell structure. The position of the blow hole in the mass, its shape, etc., differs with various conditions. In some cases the final expanded finished mass is flat on the bottom with one or several blow holes within the mass. Under other conditions the glass mass is of substantially uniform cellular structure but with an air chamber formed between the glass and the support such that the bottom of the mass is hollowed and not flat. In other cases both conditions may prevail to various extents. However, if the mass of powdered or granular glass rests on a porous or perforated support when heated, the migrating air will escape through the porous support with the result that while the total expansion of the mass is not as great, the cell structure of the mass is substantially uniform and shows no blow holes or deformation of the bottom of the cake.

From the above it is evident that it is desirable to provide for bleeding out the excess portion of the gas during the progressive heating in order to obtain an equalization of pressure.

In the continuous process described to illustrate the principles of the present invention, the bleeding of the excess gas or air and the maintenance of equal gas pressures at the zone of sintering is maintained by heating the glass mass from the sides while leaving open communication to the rear thru the moving mass.

In the practice of my invention the following elements should be considered:

*Grain size.*—Voids within granular aggregates depend upon close sizing of the grains rather than upon their average size. In fact, with all grain size down to but excepting a fine dust, the percentage of voids will remain practically constant, if the material is closely sized. The percentage of voids can be decreased materially thru inclusion within the mass of a percentage of grains substantially finer than the main body of the mass, or thru the use of a wide range of sizes, the decrease being due to the tendency of the fines to fill the interstices between the larger grains. Other factors remaining constant, the use of finer grained material will result in the formation of more and smaller cells giving a lighter material than with the larger grain batch. If the frit be ground so that a substantial part is of two hundred mesh or finer the resultant product for a given operating pressure becomes materially lighter than that produced with coarser grained batch, all out of proportion to what would normally be expected from the difference in grain size.

The term "granular glass" as used in the specification and claims is intended to include both the coarser and the most finely pulverized particles of glass which when fused and expanded will give a porous glass product.

*Mechanical pressure.*—The function of the mechanical pressure, such as that exerted by the feeding devices described above, is to hold the glass particles in contact so as to facilitate heat penetration, inhibit air migration and premature expansion as the heat penetrates the mass, and to facilitate sintering and sealing of the cells. For a maximum amount of occluded air, the mechanical pressure should be no higher than is necessary to accomplish the desired result. Pressures which are higher than necessary result in a material reduction in cell volume of the frit, but this may be counterbalanced by the use of higher air pressures as will later appear. It should be noted that the progress of the sintered material thru the sintering tube is due chiefly to the pressure exerted by the air. The mechanical pressure simply follows up the progress of the material, holding the grains in place during sintering and will constitute only a very small part of the total driving force. In fact, when operations are conducted on a batch basis, as distinguished from continuous operation, mechanical pressure may be eliminated entirely and blocks of foamed glass may be formed in open topped molds, the atmosphere about the powdered charge of glass being compressed during heating and subsequently reduced.

*Fluid pressure.*—Any gas which has no objectionable effect on the apparatus or the final product may be employed as the means for exerting fluid pressure in the above method. The specific gravity of the final product depends on the ultimate expansion of the gas cells therein which in turn depends on the amount of gas in the mixture and its pressure during the sintering operation.

Since compressed air is readily obtainable and relatively constant pressures can easily be created and maintained with it, I commonly utilize this material as the means for exerting fluid pressure in the above described process. If all of the grains of glass are substantially equal in size and especially if they are very fine the total percentage of voids in the frit is relatively large and a lower air pressure can be used to produce a given porosity. On the other hand, if a wide range of grain sizes and high mechanical pressures are used resulting in a low percentage of voids in the frit, a higher pressure will be used to produce the same porosity in the final product.

While the simple introduction of inert gas under pressure gives a satisfactory performance of my process and a desirable product, there are certain advantages to be obtained by providing for the evolution or generation of gas within the mass during the heating operation, especially if the gas is produced in the sintered mass after the cells are sufficiently formed to retain the gas. To this end in the practice of the process, finely divided carbon, carbonaceous compositions, and even metallic substances may be added to and uniformly mixed with the pulverized glass as it is introduced into the sintering tube. When this is done the fluid pressure material is so chosen as to react with the carbon or other material at about the temperature at which the glass particles fuse together or in the subsequent heating of the mass.

In a preferred modification finely divided carbon, preferably vegetable carbon as distinguished from carbon produced from bone or mineral oils, may be added to the powdered glass and superheated steam used as the fluid pressure material. At about the sintering temperature of the glass the carbon and steam react quantitatively to form hydrogen and carbon monoxide thus producing two volumes of gas for each volume of steam introduced. Similarly, if carbon dioxide gas be introduced under pressure as the fluid pressure medium, a reaction will be obtained at about the sintering temperature of the glass by which two volumes of carbon monoxide are formed for each volume of carbon dioxide introduced.

In another modification it has been found desirable to mix with the glass a small amount of finely divided zinc or even zinc oxide, as well as a moderate amount of carbon. In this case air is again used as the fluid pressure medium. When the mixture is raised to the sintering temperature of the glass the oxygen of the air combines with some of the carbon rather than with the zinc while any excess carbon tends to reduce the zinc oxide if it has been included in the mix. Thus, as the glass sinters some carbon dioxide is formed and the metallic zinc vaporizes, both combining with the gas already present in the mass to expand the individual cells to a marked degree when the external pressure is released.

As a still further modification, powdered calcium carbonate may be mixed with the powdered glass. As the glass is raised to sintering temperature this material breaks down liberating quantities of carbon dioxide.

Since the sealed feeding apparatus prevents the escape of any of the evolved gases and products of combustion the result is to raise the pressure within the mass in the sintering tube thereby effecting a higher pressure within the cells of the sintered mass than would result merely from the original introduction of the fluid under pressure. This is not only an easy method of increasing the expansibility of the sintered mass, but also fills the cells of the final article with a vapor which may have a lower heat conductivity than would be the case with air alone. Furthermore, when a metal vapor is present it condenses on cooling as a mirror coating on the cell walls thereby lowering the conductivity of the mass to radiant heat. In all of these cases the additional pressure developed by the evolution and generation of gases augments the original fluid pressure and tends to increase the rate of movement of the sintered mass thru the tube. In a sintering tube in which the ratio of circumference to cross sectional area is high, the natural tendency of the viscous mass to wet and stick to practically all types of surface will suffice to prevent excessive speed of flow, and such retardation will permit the complete sintering of the mass as it passes thru the sintering tube or furnace. On the other hand, when the ratio between circumference and cross sectional area is low, it may be desirable further to retard the speed of flow by means of a constriction in the sintering tube, preferably placed near the outlet orifice, or by making the cross sectional area of the orifice itself somewhat less than that of the sintering tube. In general, whether the fluid pressure is maintained from outside sources or partially developed by the evolution or generation of gases within the sintering chamber, pressures of from fifty to one hundred pounds per square inch will be found suitable.

*Sintering temperature.*—As pointed out above, the sintering temperature will depend upon the glass composition used, but if the temperature employed is much higher than that necessary for sintering the powdered material, it may materially reduce the amount of air entrapped, due to the collapse of the particles during sintering and before the cells are sealed.

*Expansion temperature.*—There is a definite limit to the cell expansion possible with a given initial cell gas pressure and this limit is attained with maximum temperatures but below this the temperature of expansion can be used to control the expansion and the gas pressure within the cells of the final product. Thus if a high air feed pressure is used and the expansion temperature is maintained at a point at which the frit is still quite viscous, a final product will be obtained in which the cell gas pressure will be considerably above atmospheric, but the specific gravity would be as low as would be obtained by the use of lower air pressures and higher expansion temperatures. Cell gas pressures above one atmosphere possess the advantage that they promote increased mechanical strength.

*Expansion and annealing time.*—When the expansion of the fritted mass is carried on within the confines of an expansion chamber comprising an extension of the sintering tube, as shown in Fig. 6, the product will be extruded as fast as it expands so that the timing factor in this case is self-regulating. When on the other hand the frit is extruded into a kiln for free and unconfined expansion, the time interval required for expansion will materially affect the character of the product. Best results are obtained when the frit is heated quickly, and removed from the hot zone immediately the expansion has taken place. Long soaking at the higher temperature level causes the cells to coalesce, thus forming a large cell product. In annealing, the product should be quickly chilled to a point at which viscosity is very high and then slowly cooled through the critical range in the usual manner.

While in the foregoing there has been shown and described the preferred embodiment of my invention, it is to be understood that minor changes in the process as described and in the details of construction, combination and arrangement of parts may be resorted to without departing from the spirit and scope of the invention as claimed.

I claim:

1. Apparatus for making multicellular glass, which includes a substantially horizontal sintering tube having at one end an orifice and at the other end a continuous charging means comprising a screw feeding device within the tube, means for applying and maintaining a gas under pressure within the tube including a chamber to supply material to the screw feeding device, an air lock chamber above the supply chamber and communicating therewith, a hopper above the air lock chamber and communicating therewith, means for optionally sealing the supply chamber from the air lock chamber, similar sealing means between the air lock chamber and the hopper, means for supplying compressed gas to the air lock chamber, means for heating the orifice and the adjacent portion of the sintering tube, and a heating kiln adjacent the orifice.

2. Apparatus for making multicellular glass, which includes a substantially horizontal sintering tube having at one end an orifice and at the other end a continuous charging means comprising a screw feeding device within the tube, a chamber to supply material to the screw feeding device, an air lock chamber above the supply chamber and communicating therewith, a hopper above the air lock chamber and communicating therewith, means for optionally sealing the supply chamber from the air lock chamber, similar sealing means between the air lock chamber and the hopper, means for applying and maintaining a gas pressure within the tube including ducts for supplying compressed gas to the supply chamber and the air lock chamber, an expansion tube joined to and communicating with the orifice, means for heating the tubes and the orifice, and a lehr adjoining the end of the expansion tube.

3. Apparatus for making multicellular glass, comprising a tube into which granular glass is charged and through which the charge is moved while being heated to a sintering temperature and while being maintained under a gas pressure, means at one end of the tube for admitting granular glass into the tube while maintaining gas pressure within the charge, means for applying and maintaining a superatmospheric gas pressure within the granular charge in the tube, means for heating the tube to sinter the glass, and means for moving the sintering charge through the tube, the other end of the tube having an opening for the discharge of sintered glass which glass seals said opening against the release of gas pressure maintained within the granular charge.

4. Apparatus for making multicellular glass.

comprising a tube into which granular glass is charged and through which the charge is moved while being heated to a sintering temperature and while being maintained under a gas pressure, means at one end of the tube for admitting granular glass into the tube while maintaining gas pressure within the charge, means for applying and maintaining a gas pressure within the granular charge in the tube, means for heating the tube to sinter the glass, and means for moving the sintering charge through the tube, the other end of the tube having a restricted orifice for the discharge of sintered glass which glass seals said orifice against the release of gas pressure maintained within the granular charge.

5. Apparatus for making multicellular glass, comprising a tube into which granular glass is charged and through which the charge is moved while being heated to a sintering temperature and while being maintained under a gas pressure, means at one end of the tube for admitting granular glass into the tube while maintaining gas pressure within the charge, means for applying and maintaining a gas pressure within the granular charge in the tube, means for heating the tube to sinter the glass, and means for moving the sintering charge through the tube, the other end of the tube having an opening for the discharge of sintered glass which glass seals said opening against the release of gas pressure maintained within the granular charge, the tube being provided with a liner resistant to adhesion of sintered glass whereby to facilitate the movement thereof through the tube.

6. Apparatus for making multicellular glass providing a closed system, which comprises a sintering tube to receive a granular charge, means for exerting mechanical pressure to feed the granular charge longitudinally of the tube, means for applying and maintaining a gas pressure within the granular charge, means for heating the tube to fuse the granular charge, and a heating kiln to receive the extruded charge.

7. Apparatus for making multicellular glass, comprising a tube, into which granular glass is charged and through which the charge is moved while being heated to a sintering temperature and while being maintained under a gas pressure, said tube having a discharge orifice restricted to effect substantially air-tight pressure sealing by the outflowing molten glass, means for applying and maintaining a gas pressure within the granular charge in the tube, mechanical means for feeding granular glass into the tube while maintaining gas pressure in the charge, means for heating the tube to sinter the glass and means for moving the sintering charge through the tube, the tube being provided with a liner resistant to adhesion of sintered glass whereby to facilitate the movement thereof through the tube.

SANFORD L. WILLIS.

CERTIFICATE OF CORRECTION.

Patent No. 2,255,237. September 9, 1941.

SANFORD L. WILLIS.

It is hereby certified that error appears in the printed specification of the above numbered patent requiring correction as follows: Page 5, second column, lines 25 and 26, claim 1, strike out the words "means for applying and maintaining a gas under pressure within the tube including" and insert the same after the comma and before "means" in line 34, same claim; and that the said Letters Patent should be read with this correction therein that the same may conform to the record of the case in the Patent Office.

Signed and sealed this 4th day of November, A. D. 1941.

(Seal)

Henry Van Arsdale,
Acting Commissioner of Patents.